(12) United States Patent
Singhal

(10) Patent No.: US 8,718,593 B2
(45) Date of Patent: May 6, 2014

(54) APPARATUS AND METHOD FOR AN EMERGENCY SWITCH AND A FUNCTION IN A MOBILE WIRELESS DEVICE

(76) Inventor: Tara Chand Singhal, Torrance, CA (US)

( * ) Notice: Subject to any disclaimer, the term of this patent is extended or adjusted under 35 U.S.C. 154(b) by 314 days.

(21) Appl. No.: 12/930,579

(22) Filed: Jan. 10, 2011

(65) Prior Publication Data

US 2012/0178410 A1   Jul. 12, 2012

(51) Int. Cl.
*H04W 4/02* (2009.01)
*H04W 4/22* (2009.01)

(52) U.S. Cl.
USPC ............... 455/404.1; 455/404.2; 455/550.1; 455/556.1; 379/45

(58) Field of Classification Search
CPC ....... H04W 4/22; H04W 64/00; H04W 76/10; H04W 4/02; H04W 72/04; H04W 52/02; H04W 36/00; H04W 36/22; H04W 48/06; H04W 48/18; H04W 4/04; H04W 76/00; H04W 76/007; H04M 1/236; H04M 1/233; H04M 1/00
USPC ............... 455/90.1, 404.1–404.2, 414.1, 418, 455/423, 425, 457, 517, 520–521, 550.1, 455/556.1–556.2, 563, 566, 456.2–456.3, 455/456.6, 564; 379/48, 37–43, 45, 51, 379/433.06
See application file for complete search history.

(56) References Cited

U.S. PATENT DOCUMENTS

| | | | | |
|---|---|---|---|---|
| 4,710,602 | A * | 12/1987 | Baity et al. | 200/315 |
| 5,561,702 | A * | 10/1996 | Lipp et al. | 340/7.41 |
| 6,044,257 | A * | 3/2000 | Boling et al. | 455/404.2 |
| 6,073,033 | A * | 6/2000 | Campo | 455/566 |
| 6,546,232 | B1 * | 4/2003 | Sack et al. | 455/90.1 |
| 6,697,827 | B1 * | 2/2004 | D'Agosto, III | 708/131 |
| 6,868,337 | B2 * | 3/2005 | Muramatsu | 701/431 |
| 7,433,672 | B2 * | 10/2008 | Wood | 455/404.1 |
| 2002/0004701 | A1 * | 1/2002 | Nakano | 701/200 |
| 2005/0197096 | A1 * | 9/2005 | Yang et al. | 455/404.1 |
| 2007/0293186 | A1 * | 12/2007 | Lehmann | 455/404.2 |
| 2008/0146275 | A1 * | 6/2008 | Tofflinger | 455/456.1 |
| 2010/0003958 | A1 * | 1/2010 | Ray et al. | 455/404.2 |
| 2010/0190468 | A1 * | 7/2010 | Scott et al. | 455/404.2 |
| 2010/0215153 | A1 * | 8/2010 | Ray et al. | 379/45 |
| 2011/0150190 | A1 * | 6/2011 | Stauffer et al. | 379/37 |
| 2011/0319048 | A1 * | 12/2011 | Matlock | 455/404.1 |

* cited by examiner

*Primary Examiner* — Meless Zewdu
(74) *Attorney, Agent, or Firm* — Steve Roeda Esq

(57) ABSTRACT

An emergency switch and an emergency function activated by the emergency switch are provided in a wireless mobile device. The emergency switch is positioned on an edge of the mobile device in a position that is visible and operable without activating the device. An action of the emergency switch activates the emergency function in the device. The emergency function in the device initiates a call to 911. The emergency function initiates a call to 911 and provides (i) a canned voice message that includes, owner name, owner cell telephone number, GPS location, physical address, and nature of the emergency. The emergency function activates a speakerphone connection and maintains the speakerphone connection to update the status of the emergency until the function is deactivated by the device user.

16 Claims, 7 Drawing Sheets

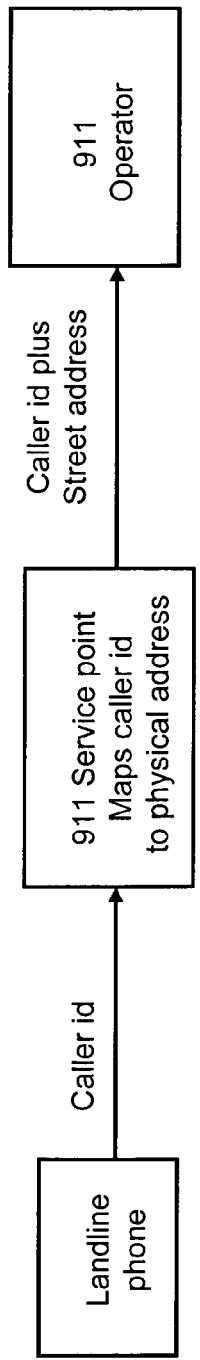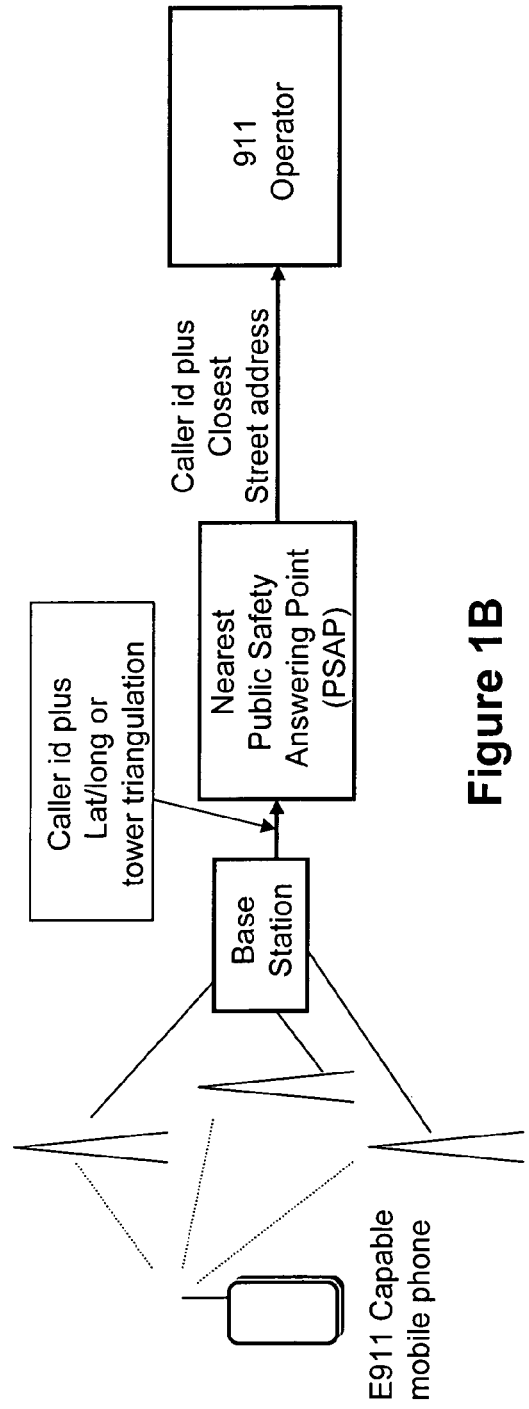
Figure 1A
Figure 1B

Emergency Function 22

>Call 911

>>Detect Live Operator pickup –

>> provide GPS data mapped Street address and nature of emergency plus cell Tel #

>>Generate a voice message plus create speakerphone connection

Provides a speakerphone mode live telephone connection.

>> plus Generate a text message option

>> plus confirm continuing nature of emergency periodically

Optional functions 24:

>>Call helper – home-relative-neighbor 24A

>>Confirm nature of emergency before calling 911 by voice message and response code 24B

Figure 4A

At step 30, providing a switch on an edge of the mobile device in a position that is visible, accessible, and operable without activating the device itself.

At step 32, activating an emergency function in the device on action of the switch activation by a device user.

At step 34, making the switch is a two part switch to separate calls to police and fire/paramedic.

At step 36, coloring one part of switch blue for indication of a police type emergency and coloring the other switch red indicative of a fire/paramedic type emergency.

At step 38, initiating a call to 911 by the emergency function.

At step 40, initiating a 911 call by the emergency function and providing (i) a canned voice message that includes, owner name, owner cell #, GPS lat long location, physical address, and nature of the emergency.

At step 42, initiating a 911 call by the emergency function and activating a speakerphone connection and optionally a live camera connection.

At step 44, maintaining speakerphone connection to update the status of the emergency until the function is deactivated by the device user.

At step 46, lighting the switch blue and red accordingly when activated;

At step 48, lighting the switch when activated and when the 911 call has been made, flashes the switch.

At step 50, activating the switch for a duration exceeding a threshold time;

At step 52, alternatively, the activation is for multiple times that may include two and three times.

At step 54, the emergency function initiates a call to a pre-stored number for a relative or friend and provides (i) a canned voice message that includes, owner name, owner cell #, GPS location and nature of emergency and (ii) a message.

Figure 5

APPARATUS AND METHOD FOR AN EMERGENCY SWITCH AND A FUNCTION IN A MOBILE WIRELESS DEVICE

CROSS REFERENCE

None

FIELD OF THE INVENTION

An emergency switch in the form of a two part, blue and a red colored, switch on the edge of a wireless mobile device activates an emergency function enabling an emergency 911 call to be placed that communicates the nature of the emergency as police or fire and paramedic and maintains a speakerphone connection without activating the mobile device itself.

BACKGROUND

Wireless mobile devices have become very common and have been acquired and are carried in their personal possession by the masses due to their low cost, convenience, and functionality. These wireless devices also come equipped with features such as speakerphone, camera and GPS location.

The US federal government has required that mobile phones be also useful and function like landline phones for dialing 911 emergency calls. That is, the mobile phones need to compute and find the physical location of the mobile device with a specified accuracy and communicate that information automatically to a 911 operator.

The following information is excerpted from the FCC website: http://www.fcc.gov/cqb/consumerfacts/wireless911srvc.html The number of 911 calls placed by people using wireless phones has radically increased. Public safety personnel estimate that about 50 percent of the millions of 911 calls they receive daily are placed from wireless phones, and that percentage is growing.

For many Americans, the ability to call 911 for help in an emergency is one of the main reasons they own a wireless phone. Other wireless 911 calls come from "Good Samaritans" reporting traffic accidents, crimes or other emergencies. Prompt delivery of these and other wireless 911 calls to public safety organizations benefits the public by promoting safety of life and property.

While wireless phones can be an important public safety tool, they also create unique challenges for public safety and emergency response personnel and for wireless service providers. Because wireless phones are mobile, they are not associated with one fixed location or address. A caller using a wireless phone could be calling from anywhere. While the location of the cell site closest to the caller may provide a very general indication of the caller's location, that information is not usually specific enough for rescue personnel to deliver assistance to the caller quickly.

As part of its efforts to improve public safety, the Federal Communications Commission (FCC) has adopted rules aimed at improving the reliability of wireless 911 services and the accuracy of the location information transmitted with a wireless 911 call. Such improvements enable emergency response personnel to provide assistance to 911 callers much more quickly.

The FCC's wireless 911 rules apply to all wireless licensees, broadband Personal Communications Service (PCS) licensees, and certain Specialized Mobile Radio (SMR) licensees. Here are the specific requirements.

Basic 911 Rules Require Wireless Service Providers to:
  transmit all 911 calls to a Public Safety Answering Point (PSAP), regardless of whether the caller subscribes to the provider's service or not.

Phase I Enhanced 911 (E911) Rules Require Wireless Service Providers to:
  within six months of a valid request by a PSAP, provide the PSAP with the telephone number of the originator of a wireless 911 call and the location of the cell site or base station transmitting the call.

Phase II E911 Rules Require Wireless Service Providers to:
  within six months of a valid request by a PSAP, provide more precise location information to PSAPs; specifically, the latitude and longitude of the caller. This information must be accurate to within 50 to 300 meters depending on the type of technology used.
  by Sep. 11, 2012, provide even more precise location information, specifically, information accurate to the closest PSAP. The FCC established a five year phase-in period for this requirement to allow wireless service providers more time to develop this capability. Wireless service providers must report to the FCC annually on their progress in supplying this more accurate location information for PSAPs with Phase II E911 capability.

Wireless service providers may comply with certain FCC E911 rules by ensuring that 95 percent of their customers' handsets are E911-capable (also referred to as location-capable). The FCC's rules permit providers to choose how they will meet this requirement. Some providers may provide incentives to encourage customers without location-capable phones to obtain new, location-capable phones. For example, they may offer location-capable handsets at a discount. Some providers may choose to prevent reactivation of older handsets that don't have E911 capability, or may adopt various other measures.

If a provider declines to reactivate a handset that is not location-capable, the FCC requires the provider to still deliver a 911 call from that handset to the appropriate PSAP. The provider, however, may not be able to accurately and automatically determine your location for the PSAP. Therefore, when replacing your handset, you should always ask about the new handset's E911 capabilities.

The FCC's 911 rules for wireless service providers are being implemented over a period of several years. In addition, cities and states must update their PSAPs to receive caller identification and location information, a costly effort that can take several years to complete. Therefore, consumers that call 911 from a wireless phone should remember the following:

Tell the emergency operator the location of the emergency right away.
  Give the emergency operator your wireless phone number so that, if the call gets disconnected, the operator can call you back.
  If your wireless phone is not "initialized" (meaning you do not have a contract for service with a wireless service provider), and your emergency call gets disconnected, you must call the emergency operator back because the operator does not have your telephone number and cannot contact you.
  To help public safety personnel allocate emergency resources, learn and use the designated number in your state for highway accidents or other non life-threatening incidents. Often, states reserve specific numbers for these types of incidents. For example, "#77" is the number used for highway accidents in Virginia. The number to call for non life-threatening incidents in your state can be found in the front of your phone book.

Refrain from programming your phone to automatically dial 911 when one button, such as the "9" key, is pressed. Unintentional wireless 911 calls, which often occur when auto-dial keys are inadvertently pressed, cause problems for emergency call centers.

If your wireless phone came pre-programmed with the auto-dial 911 feature already turned on, turn off this feature. Check your user manual to find out how.

Lock your keypad when you're not using your wireless phone. This action also prevents accidental calls to 911.

Also, consider creating a contact in your wireless phone's memory with the name "ICE" (in Case of Emergency) listing the phone numbers of people you want to be notified if there is an emergency.

While the FCC regulation provides for the equivalent 911 capability in the mobile phones for a physical location, as now exists in the landline phones, however, still more improvements and enhancements are needed in the way mobile devices may be used to make emergency calls, in the case of an emergency.

Hence it is the objective of the embodiments herein to make the emergency calls using the mobile devices more convenient. It is yet another objective to minimize the time and or the steps required to make such emergency calls.

SUMMARY

As illustrated in prior art FIG. 1A, prior art use for a 911 emergency call using fixed location landline phones required a service point to reverse look up the street address from the caller id before forwarding to a 911 operator. As illustrated in prior art FIG. 1B, FCC has mandated that the mobile phones be E911 capable so that when a 911 is called from a mobile phone, the phone physical location either based on the distance from the tower or in lat/long based on GPS service to a certain accuracy be provided to a public access service point (PSAP), which would correlate that a nearest physical address and forward the call to the 911 operator.

Wireless mobile phone handsets require multiple steps to make an emergency call. As a simplified illustration, for an I Phone®, a touch screen phone, to make a call, the caller is required (i) to activate the phone, (ii) unlock the phone, (iii) select the call function, (iv) optionally activate speakerphone, and (iv) make/dial the call. This sequence of steps though may be easy to perform in a normal use of the phone, presents issues in an environment of an emergency. The emergency may be from a number of types, where the caller may not have the time, or the mental capacity, or the physical capacity to take this sequence of steps quickly.

Therefore, as illustrated in FIG. 2, the preferred embodiments are for an apparatus for an emergency switch 10 in a wireless mobile device 12 and an emergency function 22 activated by the emergency switch 10. The emergency switch 10 is positioned on an edge of the mobile device 12 in a position that is visible, accessible, and operable without activating or operating the device by touch, flipping or sliding action.

Activation of emergency switch 10 initiates a call to 911 operator 16 and automatically provides the physical location and nature of the emergency and activates a speakerphone connection and maintains the speakerphone connection to update the status of the emergency until the function is deactivated by the device user. The emergency function 22 initiates a call to 911 and may provide (i) a canned voice message that includes, owner name, owner cell #, GPS location and nature of the emergency. The GPS location may be mapped to a physical address in the mobile device itself and provided as part of the message and the call to the 911 operator.

Thus a single action emergency switch operable through a single step Emergency Switch on the outside of the wireless mobile device, without operation and activation of the device, automatically calls 911, communicates the nature of the emergency requiring either a police vehicle or a paramedic. The emergency switch may be a two part switch. One part is colored blue for indication of a police type emergency and the other is colored red indicative of a fire/paramedic type emergency.

Thus an emergency switch operable on the outside of the wireless mobile device, easily accessible and without operation and activation of the device, activates an automatic emergency function in the device that calls 911, communicates the nature of the emergency requiring either a police vehicle or a paramedic. The function creates and maintains a live speakerphone connection with the 911 operator, enabling the detailed nature of the emergency to be further communicated by the device user efficiently through this single action emergency switch-function.

These and other aspects of the embodiments herein are further described in detail with the help of the accompanying drawings and the description.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIG. 1A-B are block diagrams that illustrate prior art in use of 911 emergency calls.

FIG. 4A is a block diagram that illustrates features of a preferred embodiment of the emergency function inside the mobile device.

FIG. 5 is a method diagram that illustrates features of a preferred embodiment for use of an emergency switch and an emergency function in a mobile device.

DESCRIPTION

Figure 2:
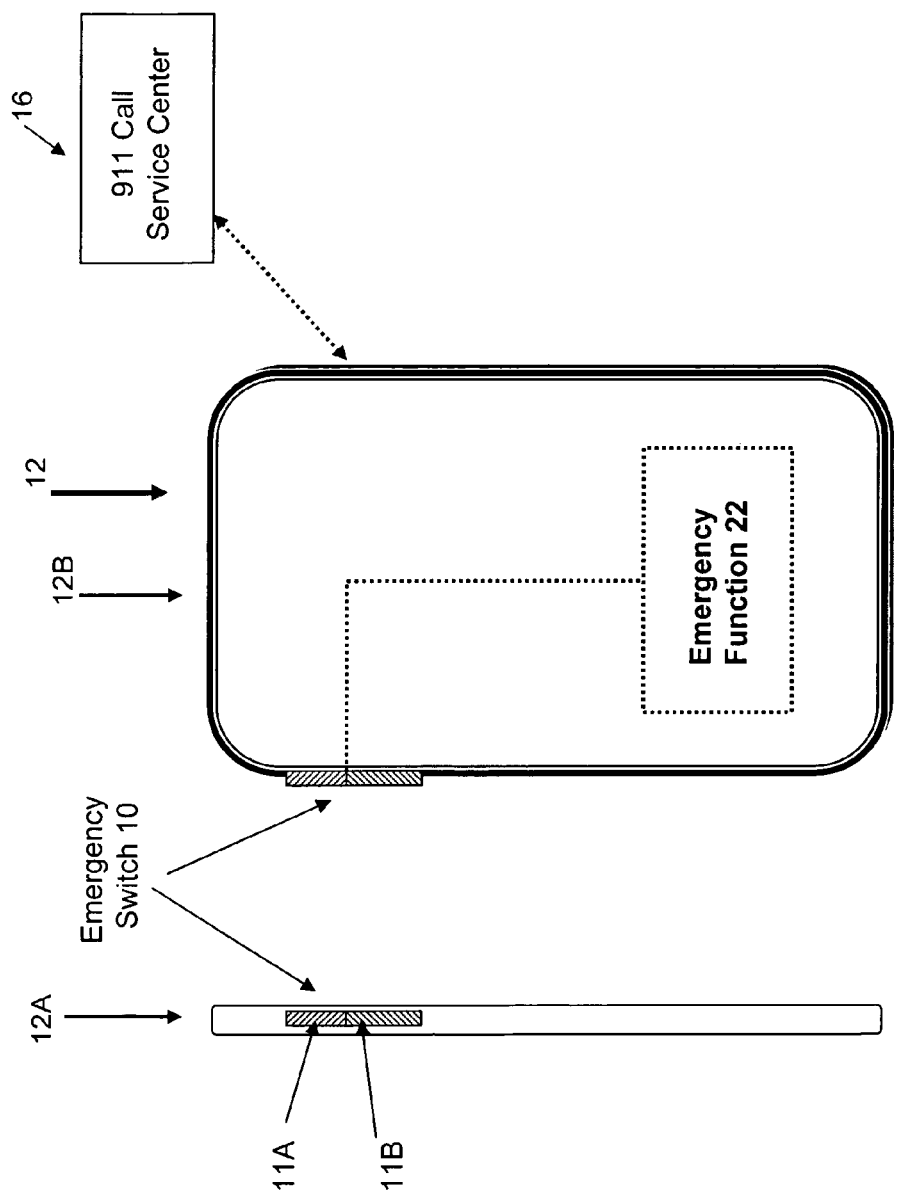
FIG. 2 is a block diagram that illustrates features of a preferred embodiment of an emergency switch on a mobile wireless device.

As illustrated in FIG. 2, an emergency switch 10 and an emergency function 22 that is activated by the emergency switch 10 is provided in a wireless mobile device 12.

Mobile wireless devices come in large variety of form factors. Generally there are three types of mobile devices, a flip phone, a slide phone and touch screen phone. There may be more or different phone types in the future. Within each of these types, there are, further, a large number of form factors.

Hence the position of the emergency switch 10 on the device 12 would from vary from one phone type to phone type and within each phone type to different form factors in that phone type.

However, each mobile phone is held in the hand and or carried in the personal possession of the owner. For example it may be anchored to the human body in a suitable location. The location of the emergency switch 10 on the mobile device, no matter how the phone is held in the hand or carried on the body before its operation, the emergency switch 10 is visible and can be activated without having to activate the phone itself by flipping or sliding open or by touch screen action.

In a preferred embodiment, as shown by side view 12A and front view 12B of the mobile device 12, the emergency switch 10 is positioned on an edge of the mobile device in a position that is visible and operable without activating the device 12. However any other way of positioning the switch 10 is not ruled out as long as it can be operated without having to operate the mobile phone itself.

People spend considerable time in their automobiles. The manufacturers of these automobiles integrate that mobile wireless function in their automobiles, where the audio may be heard over the car speakers and the phone functions may be activated by switches in the car itself such as on the steering wheel or other suitable location on the dash board. In such uses, the emergency switch 10 may also in addition be provided inside the automobile.

An action of the emergency switch 10 activates the emergency function 22 in the mobile device 12. The switch 10 may be a two part rocker switch. One part may be colored blue 11A for indication of a police type emergency and the other may be colored red 11B indicative of a fire/paramedic type emergency. There may be other arrangements of the switch which may include two different side by side spring based mechanical switches.

The technology of such switches that are present on the outside of the mobile devices and activate a software function in the device is prior art. As an example, in Motorola razor phones, a mechanical switch on the side of the phone, without flipping the phone open would mute a ringer, when a call is received. The same manufacturer also provides a single function switch that activates a function that is programmed by the user, thus enabling the single switch outside the device to activate a pre-programmed function.

The activation of the emergency switch 10 activates the emergency function 22. The emergency function 22 initiates a 911 call to a 911 operator 16 and the call may provide (i) a canned voice message that includes, owner name, owner cell #, GPS location, physical address, nearest landmark and or cross street, and the nature of the emergency.

Further, the function 22 also activates a speakerphone connection enabling the device user to stay in voice contact with the 911 operator 16 to further communicate the detailed nature of the emergency. The emergency function 22 maintains the speakerphone connection to update the status of the emergency until the function is deactivated by the device user. The speakerphone connection plays an important role for the device user to communicate without holding the phone, and for the 911 operator to hear and assess the surrounding sounds, as the emergency switch 10 may be activated in a large variety of emergency situations and surroundings that may include, auto accidents, health emergencies and fire etc. in any variety of location such as at home, near home, in a commercial building, on a road, on a highway etc.

Optionally, a live camera connection may also be activated, if such a feature is available in the mobile device 12. Almost all wireless mobile devices now days carry one or more than one camera. A live camera connection would provide the 911 operator the ability to view the surroundings to assess the nature and seriousness of the emergency that is either in progress or immediately thereafter.

Thus the emergency switch 10 operable through a single step thumb or finger action on the outside of the device, easily accessible and without operation and activation of the mobile device itself, activates an emergency function 22 in the device 12 that calls 911 and indicates the nature of the emergency and creates and maintains a live speakerphone connection with the 911 operator, enabling the nature of the emergency to be communicated efficiently through this single action emergency switch-function.

As illustrated in FIG. 2, an emergency switch 10 in a wireless mobile device 12 has the switch positioned on the mobile device in a position that is visible and operable without activating the device and an action of the switch activates a function in the device that initiates an emergency call to 911.

Optionally, the emergency switch 10 may be lighted blue or red accordingly and when activated flash when the 911 call has been made. Alternatively a small light may be positioned next to the switch, instead of having to light the switch. The technology of such lights placed on the outside of the mobile devices is prior art.

To differentiate from an accidental activation of the emergency switch 10, the emergency switch activation may be required for a duration that exceeds a threshold time such as three seconds. Alternatively, the switch activation requires that the activation is for multiple times that may include two and three times. Technology of such intentional switch activations is prior art.

Optionally, the emergency function 22 initiates a call to a pre-stored number for a relative, friend and provides (i) a canned voice message that includes, owner name, owner cell #, GPS location and nature of emergency and (ii) a message. The ability of a mobile phone to make another call or a three way call is prior art.

Figure 3:
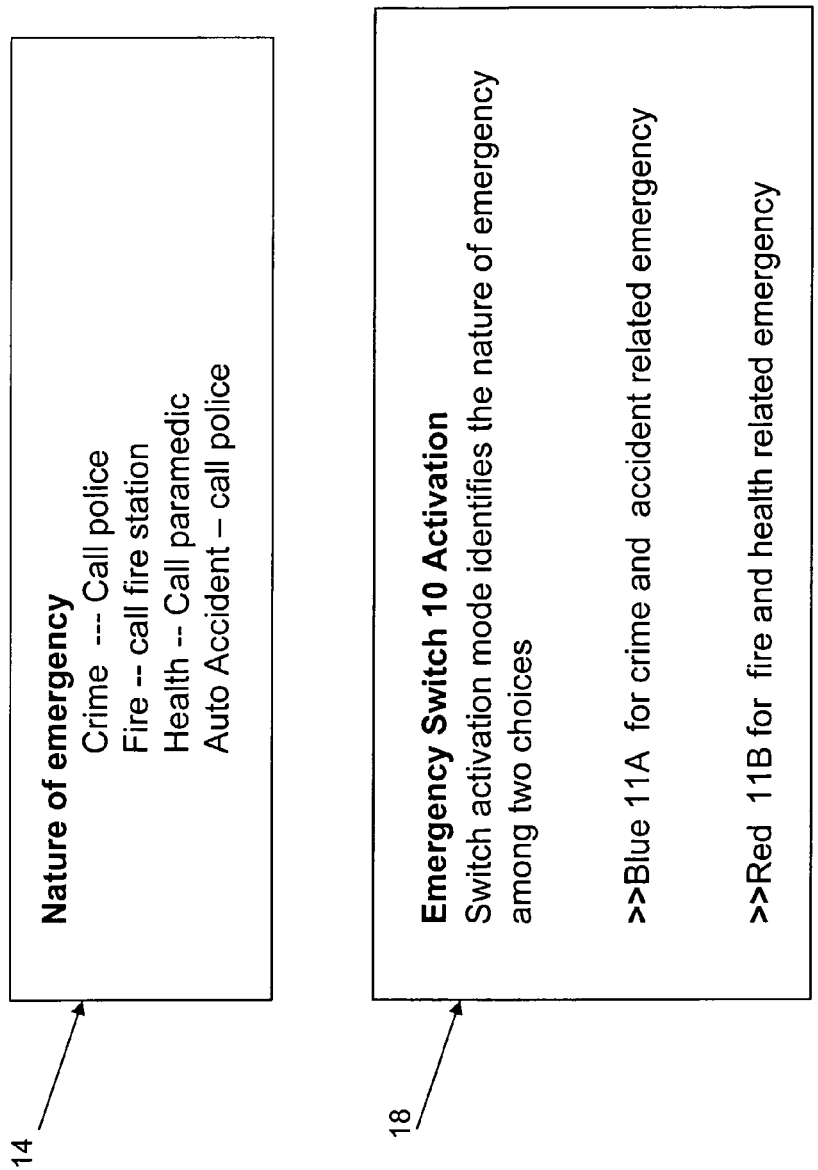
FIG. 3 is a block diagram that illustrates different categories of emergencies and how the emergency switch on the mobile device may be sued to identify the categories of the emergency.

As illustrated in FIG. 3, the nature of emergencies is delineated 14. The Nature of emergency may be a crime or auto accident that requires a police to respond. The nature of the emergency may be health or fire related, which requires a fire truck and a paramedic to respond.

As illustrated in FIG. 3, the switches 11A and 11B automatically provide 18 that nature of the emergency to the 911 operator.

As illustrated in FIG. 4A, the emergency function 22 may also provide optional features 24 that may include calling a helper that may include a family member, a friend, or a relative 24A and provide a voice message or a code indicating the nature of the emergency plus location data 24B. Instead of a call or in addition an SMS message may also be sent.

The technology of implementing software functions activated by a switch activation is prior art and is widely used in any number of mobile phone devices for activating functions in the mobile device. These functions may be standalone or integrated with the operating system as utility functions.

The emergency switch 10 type may be a rocker type or a slide type with a spring action. The switch may also be a lighted switch that is lighted when activated. The lighting may correspond to red and blue colors. Optionally, the switch light flashes in different colors, indicating that 911 has been called or a call is in progress. The technology of implementing such lights on the outside of the mobile phones is prior art.

To not allow accidental operation of the emergency switch 11A or 11B, the switch may only be activated when pressed multiple times such as twice or thrice. Alternatively the switch may be pressed for a duration that require it to be pressed for three seconds indicating an intentional activation of the emergency switch. Alternatively, the emergency function may confirm nature of emergency through the speakerphone to the device user by alerting him/her before calling 911, enabling him/her to cancel the call, to 911 operators.

As illustrated in FIG. 4A, the switch also initiates a function 24 that initiates a call to a pre-stored number for a relative or friend and provides (i) a canned voice message that includes, owner name, owner cell telephone number, GPS location, physical address, and nature of emergency and (ii) a message.

Emergency Function 22

Figure 4B:
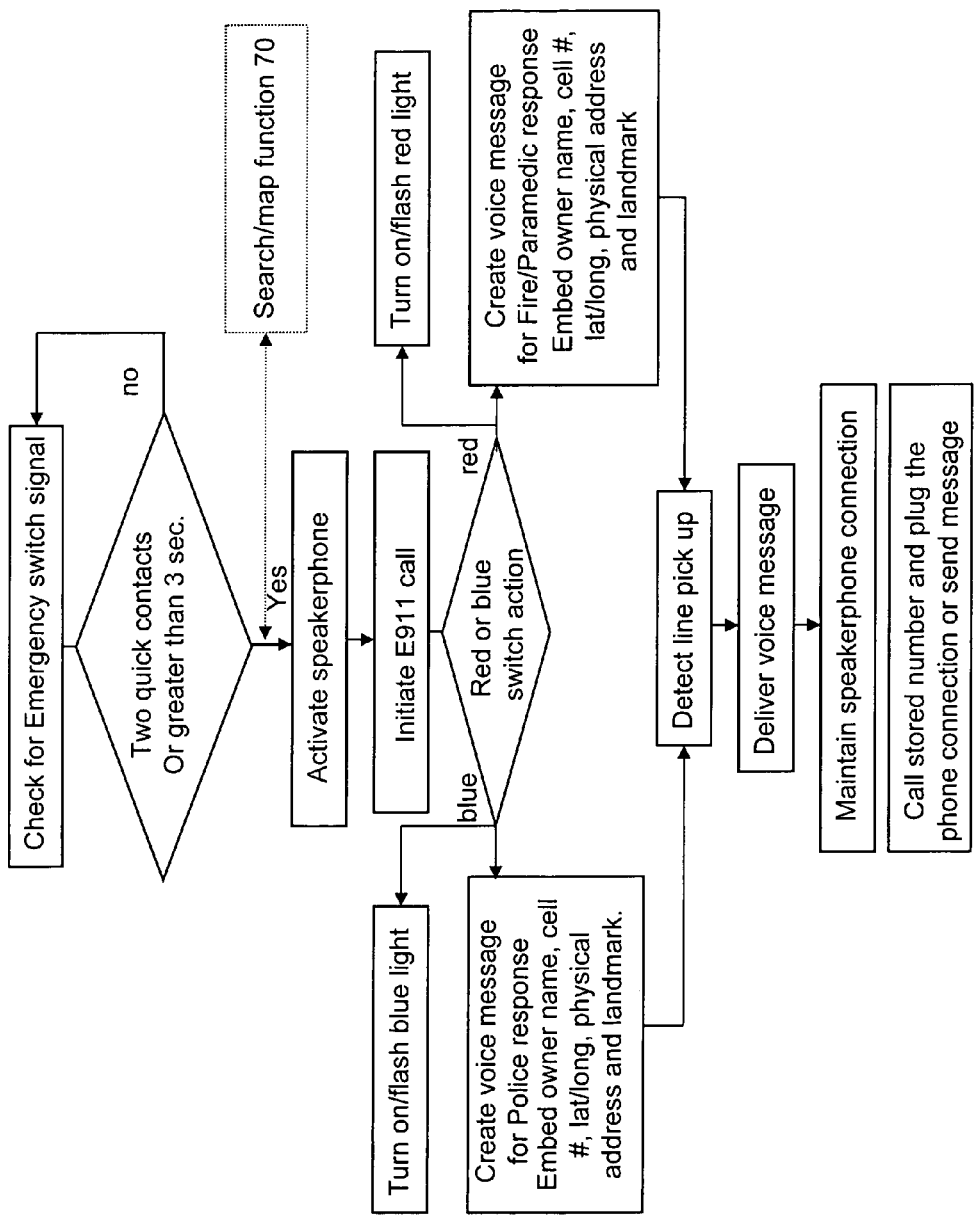
FIG. 4B is a flow chart block diagram that illustrates features of a preferred embodiment of the emergency function inside the mobile device.
Figure 4C:
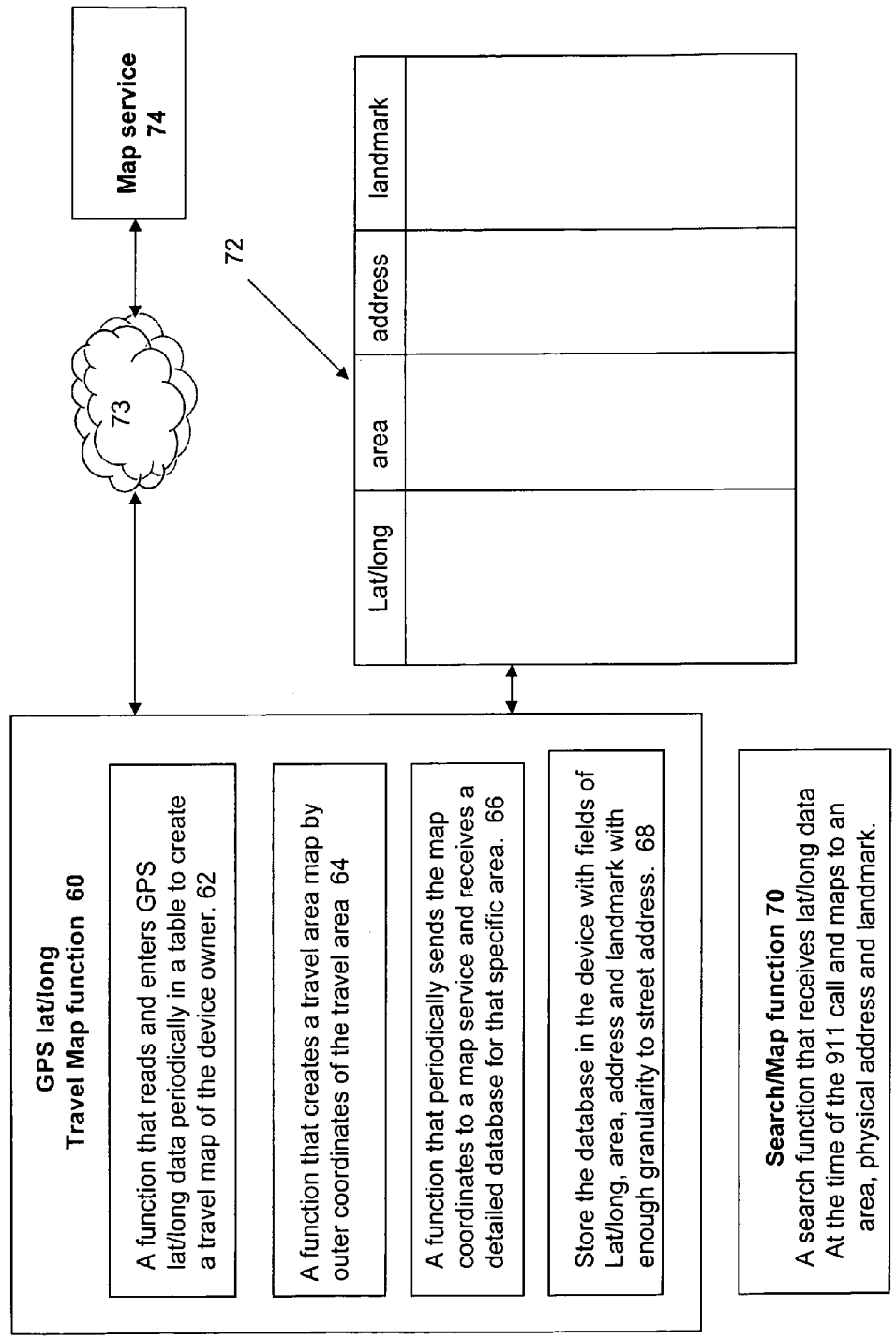
FIG. 4C is a block diagram that illustrates features of a preferred embodiment of the emergency function for converting a GPS location in lat/long to a physical address inside the mobile device.

FIGS. 4A, 4B, and 4C illustrate the operation of the emergency function 22. FIG. 4A illustrates the functions, while FIG. 4B illustrates a logic flow diagram. FIG. 4C illustrates a software function that converts a GPS derived lat/long position to a physical address.

The software implemented emergency function 22 may be integrated with the operating system of the device 12 and activated by the emergency switch 10 activates a call to 911. The call provides location data as mandated by the new federal regulations. Alternatively or in addition the 911 call provides GPS data that is mapped to a nearest street address and nature of emergency based on which switch 11A or 11B was activated. In addition the call also provides cell telephone number.

When the function 22 detects live 911 operator pickup, the function generates a voice message plus, provides a speakerphone mode live telephone connection. A text message may also be generated as an option and sent at the same time. The speakerphone connection may be maintained that may annunciate the nature of the continuing emergency periodically.

FIG. 4B illustrates a flow diagram of the function 22. The flow diagram shows functions that receive the switch activation input, determine accuracy of emergency activation, optionally use a search map function 70 to map the GPS lat/long data to a physical address, activate the speakerphone and initiate a 911 call.

The flow diagram, then determines the nature of the emergency by switch activation and creates an appropriate voice message file, detects the operator pick-up and delivers the voice message, annotated as required. The message embeds owner name, cell number, lat/long, physical address, and nature of emergency. The flow diagram shows that the function 22 maintained the speakerphone connection and activates a camera connection. The function may also call a stored number with the same message and duplicate by an SMS.

FIG. 4C illustrates a function 60 that may be used to convert the lat/long data from the GPS sensor to a travel map. A function 70 converts a lat/long data in that travel map to physical address and a nearest landmark via a search/map function 70. The search/map function 70 receives lat/long data at the time of the 911 call and maps to an area, physical address and a landmark.

The function 60 includes a function that reads and enters GPS lat/long data periodically in a table to create a travel map of the device owner 62; a function that creates a travel area map by outer coordinates of the travel area 64; a function that periodically sends the map coordinates to a map service 74 over the wireless network 73 and receives a detailed database 72 for that specific area 66; a function that stores the database in the mobile device with fields of lat/long, area, address and landmark with enough granularity to resolve street address 68, as shown in the database 72.

The travel map logs the lat/long of the routes in the travel map. The travel map may be updated every day or every week based on the pattern of movement of the device owner. The map service 74 that would map a lat/long to a physical address is prior art and is in common use.

The travel area is likely to be between home and one or more work places and recreation areas, and is likely to be limited to small region of a state or multiple states. Such a limited travel area makes the database 72 to be of a manageable size for storage in the device 12's storage memory. As a simplified illustration, the number of physical addresses in a travel area may number a few hundred thousands providing for a mapping from their lat/long locations to the physical addresses. The modern mobile phones have enough memory to accommodate data of such sizes.

As illustrated in FIG. 4C, a function 70 inside a mobile wireless device when input lat long data from a GPS function outputs a physical address corresponding to that data. input lat long data outputs a physical address corresponding to that data. The function 70 when input fat long data outputs a physical address and a nearest landmark, corresponding to that data, where the address and landmark is provided as part of a message to a 911 operator.

These features, it is believed, may enable the wireless mobile devices to provide E911 capability within the handsets itself, without the cooperation of the wireless networks themselves in providing PSAP functionality to provide physical address data. However, this does not preclude the PSAPs in the future to perform that function of mapping lat/long to a physical address. The embodiments as described here may enable a full E911 capability to be provided earlier in time than mandated by the FCC rules.

Method of Operation

As illustrated in FIG. 5, a method for an emergency function in a wireless mobile device has the following steps, where all the steps may not be used or used in the order specified.

At step 30, providing a switch on the mobile device in a position that is visible, accessible, and operable without activating the mobile device.

At step 32, activating an emergency function in the device on action of the emergency switch.

At step 34, making the switch a two part switch.

At step 36, coloring one part blue for indication of a police type emergency and coloring the other red indicative of a fire/paramedic type emergency.

At step 38, initiating a call to 911 by the emergency function.

At step 40, initiating a 911 call by the emergency function and providing (i) a canned voice message that includes, owner name, owner cell #, GPS location, physical location, and nature of the emergency.

At step 42, initiating a 911 call by the emergency function and activating a speakerphone connection and optionally a live camera connection.

At step 44, maintaining speakerphone connection by the emergency function to update the status of the emergency until the function is deactivated by the device user.

At step 46, lighting the switch blue and red accordingly when activated;

At step 48, lighting the switch when activated and when the 911 call has been made, flashes the switch.

At step 50, activating the switch for a duration exceeding a threshold, time;

At step 52, alternatively, the activation is for multiple times that may include two and three times.

At step 54, the emergency function initiates a call to a pre-stored number for a relative, friend and provides (i) a canned voice message that includes, owner name, owner cell #, GPS location and nature of emergency and (ii) a message.

In summary, the preferred embodiments are for an apparatus for an emergency switch in a wireless mobile device and an emergency function activated by the emergency switch. The emergency switch is positioned on an edge of the mobile device in a position that is visible and operable without activating the device.

Activation of emergency switch initiates a call to 911 and automatically provides the location and nature of the emergency and activates a speakerphone connection and maintains the speakerphone connection to update the status of the emergency until the function is deactivated by the device user. Thus a single action emergency switch operable through a single step Emergency Switch on the outside of the wireless mobile device, without operation and activation of the device, automatically calls 911, communicates the nature of the emergency requiring either a police vehicle or a paramedic.

While the particular invention, as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A wireless mobile communication device having an emergency function comprising:
   a. a wireless mobile communication device operative in a wireless communication network, the device has an emergency switch that is positioned on an edge of the mobile device in a position that is visible and operable without activating the device, the switch is a two part switch, one part is colored and lighted blue when activated for indication of a police type emergency, the other is colored and lighted red when activated indicative of a fire/paramedic type emergency;
   b. an emergency function operative from the memory of the device in the processor of the device that is activated by the emergency switch;
   c. the emergency function initiates a call to 911 and activates a speakerphone connection, thereby the emergency switch minimizes the steps that are required to call for help in an emergency.

2. The emergency function as in claim 1, further comprising:
   the emergency function initiates a call to the 911 and provides (i) a canned voice message that includes, owner name, owner cell #, and GPS location.

3. The emergency function as in claim 1, further comprising:
   a. the emergency function initiates a call to the 911 and activates a speakerphone connection and optionally a live camera connection;
   b. the emergency function maintains the speakerphone connection to update the status of the emergency until the function is deactivated by the device user.

4. The emergency function as in claim 1, further comprising:
   a. the switch is a lighted blue and red correspondingly when activated;
   b. activation lights the switch and when the 911 call has been made, flashes the switch.

5. The emergency function as in claim 1, further comprising:
   a. the switch activation is for a duration exceeding a threshold time;
   b. alternatively, the activation is for multiple times that may include two and three times.

6. The emergency function as in claim 1, further comprising:
   the emergency function initiates a call to a pre-stored number for a relative, friend and provides (i) a canned voice message that includes, owner name, owner cell #, GPS location and nature of emergency and (ii) a message.

7. A method for an emergency function in a wireless mobile device comprising the steps of:
   a. providing an emergency switch on the communication device and positioning the switch on an edge of the mobile communication device in a position that is visible and operable without activating the device where the communication device is operative in a wireless communication network; making the switch a two-part switch, coloring and lighting one part blue when activated for indication of a police type emergency and coloring and lighting the other red when activated indicative of a fire/paramedic type emergency;
   b. activating the emergency function in the device on action of the emergency switch by a device user;
   c. initiating by the emergency function a call to 911 and activating a speakerphone connection, thereby the emergency switch minimizes the steps that are required to call for help in an emergency.

8. The method for the emergency function as in claim 7, comprising the steps of:
   initiating a 911 call by the emergency function and providing (i) a canned voice message that includes, owner name, owner cell #, and GPS location.

9. The method for the emergency function as in claim 7, comprising the steps of:
   initiating the 911 call by the emergency function and activating a speakerphone connection and optionally a live camera connection;
   maintaining the speakerphone connection by the emergency function to update the status of the emergency until the function is deactivated by the device user.

10. The method for the emergency function as in claim 7, comprising the steps of:
    a. lighting the switch blue and red correspondingly when activated;
    b. lighting the switch when activated and when the 911 call has been made, flashes the switch.

11. The method for the emergency function as in claim 7, comprising the steps of:
    a. activating the switch for a duration exceeding a threshold time;
    b. alternatively, the activation is for multiple times that may include two and three times.

12. The method for the emergency function as in claim 7, comprising the steps of:
    the emergency function initiates a call to a pre-stored number for a relative, friend and provides (i) a canned voice message that includes, owner name, owner cell #, GPS location and nature of emergency and (ii) a message.

13. An emergency switch in a wireless mobile communication device operating in a wireless network comprising:
    a. the emergency switch is positioned on the mobile device on an edge of the device in a position that is visible and operable without activating the device, the switch is a two part switch, one part is colored and lighted blue when activated for indication of a police type emergency, the other is colored and lighted red when activated indicative of a fire/paramedic type emergency; and b. an action of the switch activates a function in the device that initiates an emergency call to 911 and activates a speaker phone connection.

14. The emergency switch as in claim 13, further comprising:

the emergency switch also initiates a function that initiates a call to a pre-stored number for a relative or a friend and provides (i) a canned voice message that includes, owner name, owner cell #, GPS location and (ii) a message.

15. A function in a wireless mobile communication device operating in a wireless network comprising:

a. the function operative from a memory in a processor inside the mobile wireless device when input a sequence of lat long data from a GPS function creates a map of travel area with map area coordinates;

b. the function for the travel area identified by the map coordinates retrieves from a server a table of physical addresses and landmarks in that area;

c. the function using the table and the lat long data, outputs a physical address and a closest landmark corresponding to that data;

d. an emergency function on activation of an emergency switch on an edge of the device, where the switch is a two part switch, one part is colored and lighted blue when activated for indication of a police type emergency, the other is colored and lighted red when activated indicative of a fire/paramedic type emergency, wirelessly transmits the physical address and the closest landmark to an emergency response system.

16. The function in a wireless mobile device as in claim 15, comprising:

the function when input lat long data outputs the physical address and the nearest landmark, corresponding to that data, where the address and the closest landmark is provided as part of a message to a 911 operator.

* * * * *